(12) United States Patent
Repperger et al.

(10) Patent No.: US 7,627,190 B1
(45) Date of Patent: Dec. 1, 2009

(54) COMPUTATIONALLY ENHANCED IMAGE RECOGNITION SYSTEM

(75) Inventors: Daniel W. Repperger, Dayton, OH (US); Alan R. Pinkus, Bellbrook, OH (US)

(73) Assignee: The United States of America as represented by the Secretary of the Air Force, Washington, DC (US)

( * ) Notice: Subject to any disclaimer, the term of this patent is extended or adjusted under 35 U.S.C. 154(b) by 798 days.

(21) Appl. No.: 11/398,743

(22) Filed: Mar. 31, 2006

(51) Int. Cl.
*G06K 9/00* (2006.01)

(52) U.S. Cl. .................. 382/254; 382/162; 382/168

(58) Field of Classification Search ............ 382/254, 382/162, 167, 168
See application file for complete search history.

(56) References Cited

U.S. PATENT DOCUMENTS

| | | | |
|---|---|---|---|
| 4,398,685 A | 8/1983 | Task et al. | |
| 5,070,239 A | 12/1991 | Pinkus | |
| 5,679,949 A | 10/1997 | Task et al. | |
| 5,729,010 A | 3/1998 | Pinkus et al. | |
| 6,775,408 B1 * | 8/2004 | Masaki | 382/167 |
| 7,177,452 B2 * | 2/2007 | Wong et al. | 382/128 |
| 2006/0110033 A1 * | 5/2006 | Toshihiro | 382/162 |

OTHER PUBLICATIONS

David R. Martin, "Learning to Detect Natural Image Boundaries Using Local Brightness, Color,and Texture Cues", IEEE Transactions on Pattern Analysis and Machine Intelligence, vol. 26, No. 5, May 2004, pp. 530-549.*

* cited by examiner

*Primary Examiner*—Samir A Ahmed
*Assistant Examiner*—Mekonen Bekele
(74) *Attorney, Agent, or Firm*—AFMCLO/JAZ; Gina S. Tollefson (57) ABSTRACT

Method for enhancing visual images. An operator manipulates a visual image by adjusting darkness levels within each primary color to embellish the recognition of distinct objects which may appear in the visual rendering. The overall system can be implemented as a ground-based system where the operator can adjust the algorithm to manipulate the darkness levels of a certain number, N, of pixels. A second implementation can be achieved in a helmet mounted display or glasses donned by an operator.

15 Claims, 10 Drawing Sheets

Now Add a *Little* Noise to the Subliminal Signal

Fig. 5B

Now Add a *Lot of* Noise to the Subliminal Signal

$J_1$ versus noise intensity and Monte carlo Parameter

COMPUTATIONALLY ENHANCED IMAGE RECOGNITION SYSTEM

RIGHTS OF THE GOVERNMENT

The invention described herein may be manufactured and used by or for the Government of the United States for all governmental purposes without the payment of any royalty.

BACKGROUND OF THE INVENTION

Often in real war-time scenarios, an operator of an air or ground based vehicle uses imaging equipment in order to assess threat and make strategic decisions. A significant problem in this field is often the quality of such visual images and more specifically the problem of helping to distinguish objects that may appear in a visual image when the vehicle operator has to make a decision about the content of the picture in a short amount of time.

The present invention solves the problem of distinguishing objects that may appear in a visual image of poor quality and where an operator has to make a decision about the content of such image in a short amount of time. To better understand the decision-making process of interest, a simple military example will be first discussed. In the military application, the effects of being too aggressive or too conservative in decision-making have both costs and risks. For an example of a military application related to this scenario, assume a decision maker approaches a tree in a foreign country with a person hiding in the tree. The person in the tree may be either friendly or hostile. An immediate action of the decision-maker is required. If the decision-making process is too aggressive, the soldier on the ground will shoot at the object in the tree. If the soldier in the tree is friendly (not hostile), this "friendly fire" incident has a great penalty to the decision-maker. On the other hand, if the object in the tree is a hostile (enemy) soldier, the conservative decision to not fire at the object may result in the enemy soldier attacking the decision-maker. Thus the error in ignoring the information is even more costly to the person making the action who is required to elicit a binary choice response.

Figure 4A:
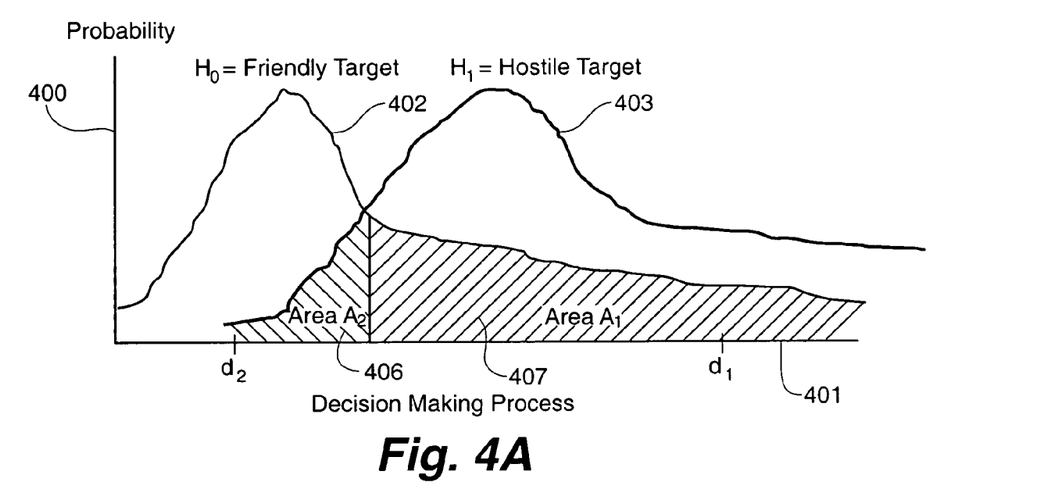
FIG. 4a shows a graph illustrating the first type of error that could occur for the man-in-the-tree military scenario.
Figure 4B:
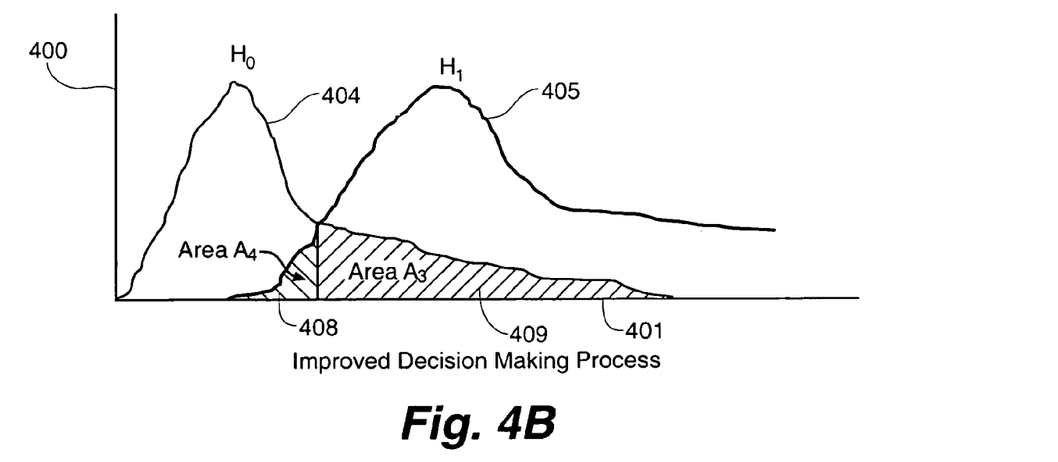
FIG. 4b shows a graph illustrating the second type of error that could occur for the man-in-the-tree military scenario.

FIGS. 4a and 4b describe, in a statistical manner, the two types of errors that could occur for our military example of the identification of the man-in-the-tree just presented. In FIGS. 4a and 4b the x-axis at 401 represents decision making and the y-axis at 400 represents the probability of the intention of the man in the tree. In FIGS. 4a and 4b, the hypothesis $H_0$ is the true situation that the man in the tree is friendly, illustrated at 402 and 404. $H_1$ is the true situation that the man in the tree is hostile. Let us define type 1 error (friendly fire) as the event of shooting the object in the tree when it is really friendly. In FIG. 4a, this corresponds to the area A1 at 407. In FIG. 4a, we define the type 2 error (mistake of not firing at the tree) as the situation that the man in the tree is hostile but since we do not fire, the hostile agent attacks us and this is represented as area A2 at 406. The ideal situation in decision making is to minimize both the type 1 and type 2 errors at the same time.

FIG. 4a shows the types of error that exist for a binary decision-making process. Usually the decision maker operates on some measurement on the x-axis. This may be translated into the terms "don't shoot until you see the whites of their eyes". In other words, some measurement is made on the x-axis of a variable in the environment and then an action has to be decided as belonging to the class $H_0$ or $H_1$ based on the measurement. The decision maker may be more or less aggressive depending on the measurement on the x-axis before selecting either $H_0$ or $H_1$. Thus there is a trade off between the type 1 and type 2 error thus described. The total error does not actually decrease, it just trades off (e.g. if you want less type 1 error, we absorb more type 2 error and conversely). A significant aspect of the present invention is introducing a different approach to this basic problem of decision making.

Figure 7:
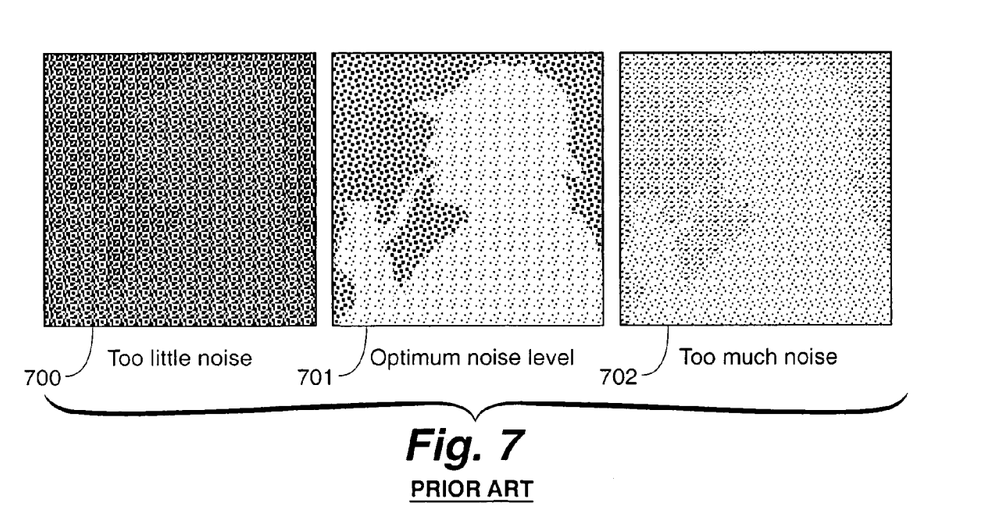
FIG. 7 shows a drawing illustrating how stochastic noise can enhance a visual image.

It has been documented in prior works that for certain images, by adding small amounts of noise, it is possible to enhance the recognition of specific objects in the picture. What is significant is how the noise was added. FIG. 7 shows a drawing illustrating how stochastic noise can enhance a visual image. In FIG. 7, this classic example simply added white Gaussian noise in going from left 700 to 701 and right 702. There appears to be an optimum amount of noise 701 that enables better object identification. Too little 700 or too much 702 noise is counterproductive in the identification of the object in the picture. This leads into a significant novel aspect of the present invention and solves the problem in the prior art. In the prior art, random errors are added to a visual image in a manner that object identification is improved. The present invention discloses a systematic procedure to visually enhance images by adjusting darkness levels within each primary color to embellish the recognition of distinct objects which may appear in the visual rendering.

SUMMARY OF THE INVENTION

A method is described in which a visual image is enhanced to better recognize different objects that appear in a picture. A visual image is manipulated by adjusting darkness levels within each primary color to embellish the recognition of distinct objects which may appear in the visual rendering. The overall system can be implemented as a ground-based system where the operator can adjust the algorithm to manipulate the darkness levels of a certain number, N, of pixels. A second implementation can be achieved in a helmet mounted display or glasses donned by an operator.

It is an object of the invention to provide an image enhancement method that enhances an operator's ability to recognize different objects that appear in a picture.

It is another object of the invention to provide an image enhancement method that enhances an operator's ability to recognize different objects that appear in a picture by adjusting darkness levels within each primary color to embellish the recognition of distinct objects which may appear in the visual image.

It is another object of the invention to provide a ground-based image enhancement method that enhances an operator's ability to recognize different objects that appear in a picture.

It is another object of the invention to provide a head-mounted image enhancement method that enhances an operator's ability to recognize different objects that appear in a picture.

These and other objects of the invention are achieved through the description, claims and accompanying drawings and by an image enhancement method comprising the steps of:

receiving visual data of a desired object within a compressed image using multi-spectral sensors;

transmitting said visual data to a central processing unit;

decomposing said visual data into histograms of frequency of pixels versus darkness level within each primary color red, blue and green and selecting the most highly uncertain color;

constructing a parabolic template with the vertex of the parabola appearing at the mean distribution of the total area under the histogram curve;

overlaying a true histogram from said visual data and said parabolic template;

generating a spatial gradient of all candidate pixels;

moving N number of pixels with maximum gradients through operator adjustment knob manipulation; and transferring an output signal of an enhanced visual image of said desired object from said central processing unit to said operator.

DETAILED DESCRIPTION

The present invention solves the problem of distinguishing objects that may appear in a visual image of poor quality and where an operator has to make a decision about the content of such image in a short amount of time. The present invention is described as both a ground-based arrangement and a head-mounted arrangement.

Ground-Based Image Enhancement System

Figure 1:
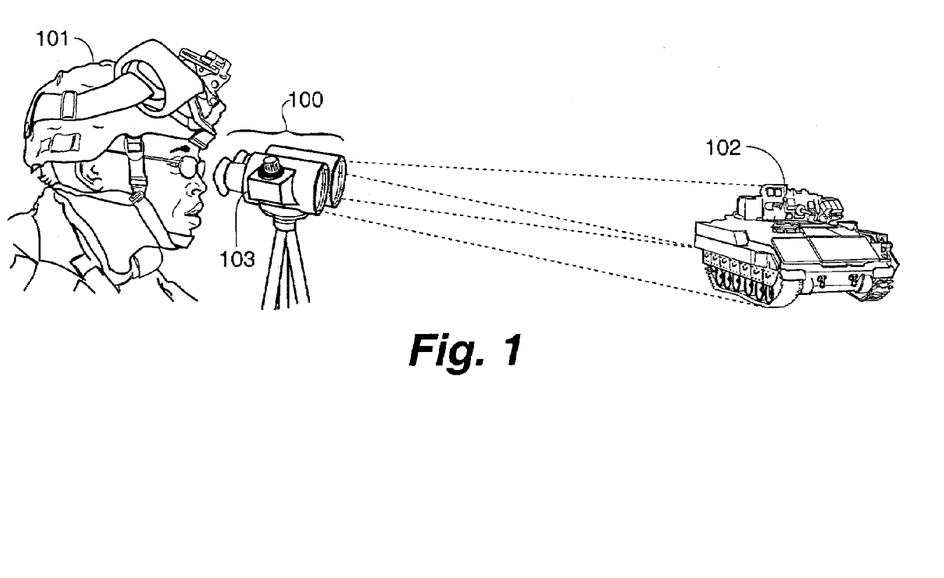
FIG. 1 shows a drawing of a binocular-type digital imaging system.

In the ground-based image enhancement system of the present invention, the operator is in a stationary position situated across from a ground-based system and a visual image of poor quality is portrayed to him as in FIG. 1. FIG. 1 shows a drawing of a binocular-type digital imaging system. In this preferred arrangement of the invention, the operator 101 adjusts a knob 103, on binoculars 100 which controls (through a central processing unit as indicated) how the darkness level of certain pixels in the picture (within each primary color) may be manipulated. The operator continues to adjust the modified picture by turning the knob until he feels maximum information has been received from the external environment in terms of recognizing distinct objects 103 in the picture. This has analogies to focusing a normal light lens until the image appears sharper or has higher contrast and the identification in terms of the objects within the image becomes improved.

Figure 2:
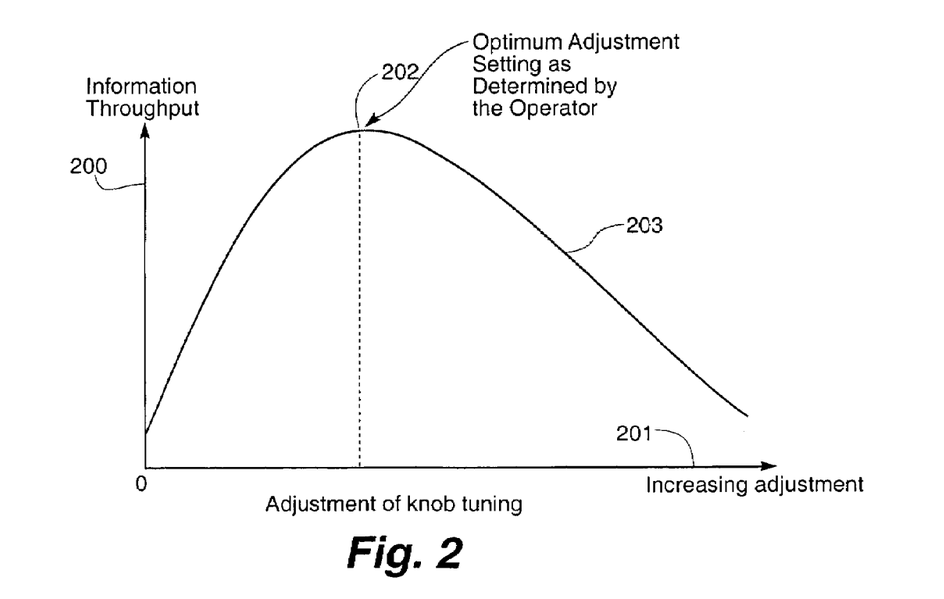
FIG. 2 shows a graph illustrating the shape of the information throughput curve as a result of knob tuning.

As it will be shown, the shape of the information throughput curve generated by the human is displayed in FIG. 2. The x-axis at 201 in FIG. 2 corresponds to turning the adjustment knob 103 in FIG. 1 and the y-axis 200 in FIG. 2 corresponds to the information throughput 203 which is shown at an optimal setting at 202. The operator 101 manipulates the adjustment knob 103 until he feels comfortable that the visual rendering of the scene 102 is improved over its original state.

Use of a Helmet Mounted Display or Eye-glass System

Figure 3:
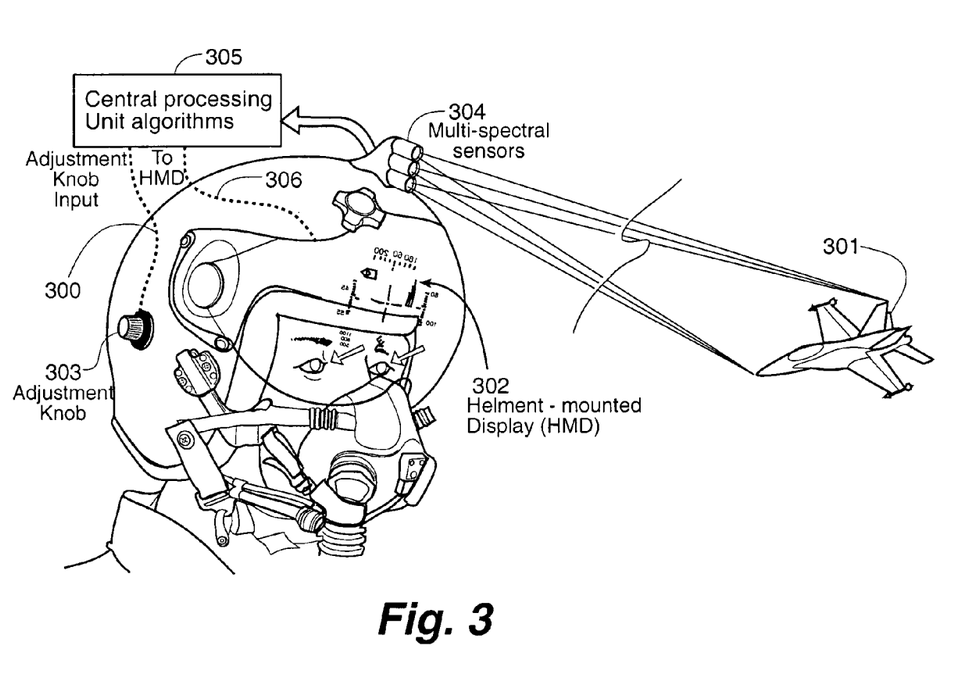
FIG. 3 shows a drawing of head mounted display system.

Another preferred arrangement of the invention is with an operator wearing a helmet-mounted display or eye-glass system and having mobility. FIG. 3 shows a drawing of head mounted display system. In FIG. 3, the aircraft object 301 to be examined impacts the visual display at the multi-spectral sensors 304. These data are then transferred to the central processing unit 305, which may consist of a chip or other microprocessor element. At the central processor 305 is a signal 300 received from the output of the adjustment knob 303. After the image is enhanced, the final output signal to the HMD (head mounted display) 302 is transferred from the CPU to the HMD at 306. The signal is further transferred to the optical glass 302 as indicated. The operator sees the enhanced image at the optical glass. There may exist a latency in producing the enhanced image at point 302 because of the computation time and cycle time to process the requisite information. Early prototypes of this technology may have low bandwidth as a consequence of the latency of the loop, however, with more sophisticated hardware realizations of the system in FIG. 3, the latency may be significantly reduced.

A Method of Reducing Error

In FIG. 4b, a novel decision making process of the present invention is described. The former Type 1 error ($A_1$) is now replaced by the area $A_3$ at 409 in FIG. 4b. Note that in FIG. 4b, this area is reduced, i.e., $A_3 < A_1$. Also, the former Type 2 error ($A_2$) is now replaced by the area $A_4$ at 408 in FIG. 4b. Again, this type 2 error is reduced in FIG. 4b because $A_4 < A_2$. Thus both the former type 1 and type 2 errors are reduced simultaneously. This differs from the traditional methods where the errors just trade off against each other. The stochastic resonance method of the present invention will provide a platform to perform this simultaneous reduction of both the type 1 and type 2 errors.

Illustration of the Concept of Stochastic Resonance

The term "stochastic resonance" (SR) is used in certain contexts to mean that noise or some uncertainty (stochastic) may be added to a process in an appropriate manner and that certain "resonance" or optimization of some key attribute of a system may be realized. Applying this to the present invention, the attribute that will be optimized (improved) is the information delivered to the human operator in terms of recognizing distinct objects in a visual scene, which is of poor quality. Stochastic resonance is a nonlinear process and does not work in every case. It must be applied appropriately. The present invention provides a systematic procedure to apply this technique to visual images.

Figure 5A:
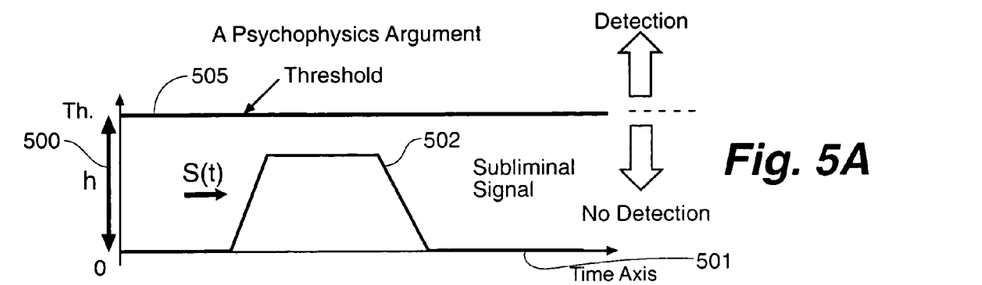
FIG. 5a shows a graph illustrating stochastic noise with no noise added according to the method of the invention.
Figure 5B:
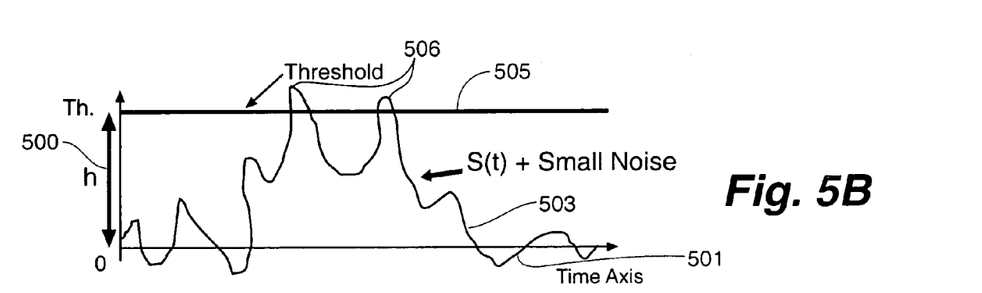
FIG. 5b shows a graph illustrating subliminal signal in its high state according to the method of the invention.
Figure 5C:
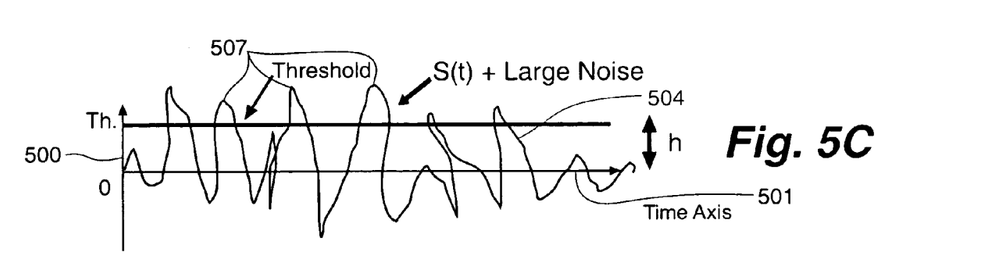
FIG. 5c shows a graph illustrating stochastic noise with a high level of noise added according to the method of the invention.

One interpretation of SR is in the identification of faint signals when they are below a threshold. FIGS. 5a, 5b and 5c are graphs of subliminal signals with levels of added noise. For each of FIGS. 5a, 5b and 5c, the x-axis represents time at 501 and the y-axis represents the threshold level h at 500. FIG. 5a shows a faint (subliminal signal) S(t) at 502 which is below the threshold 505 of h units. Similar to identifying the hostile soldier in the tree, the binary decision to be made involves the correct detection when S(t) is high. Since the maximum value of S(t) is always below the threshold h, (|S(t)|<h), there is initially a zero probability of correctly detecting S(t) as being high, when it is truly in this state. FIG. 5a corresponds to the case of no noise added to S(t) 502. FIG. 5b shows the situation when a low level of white-Gaussian noise is added to S(t) 503. In 5b, it can be seen that when S(t) is in its high state, it occasionally will pierce through the threshold h 505 and be detected, illustrated at 506. Thus the number of missed negatives is reduced (a missed negative is defined as S(t) really being high, but we miss the opportunity to correctly classify it as high). FIG. 5c shows the situation where a high level of noise is added to S(t), illustrated at 504. In FIG. 5c, when S(t) is high, it most likely will pierce through the threshold h and be classified as being in the high state. Thus the number of missed negatives continues to decrease as the intensity of the noise increases. However, in FIG. 5c, when S(t) is in the low state, it sometimes still pierces through the threshold h producing a false error, illustrated at 507. Thus, the disadvantage of the high noise state is that the number of false positives increases. One would assume that there is an "optimum" amount of noise to add to S(t) to enhance the correct detection of S(t) when it is really high, but not produce too many false positives.

Figure 6:
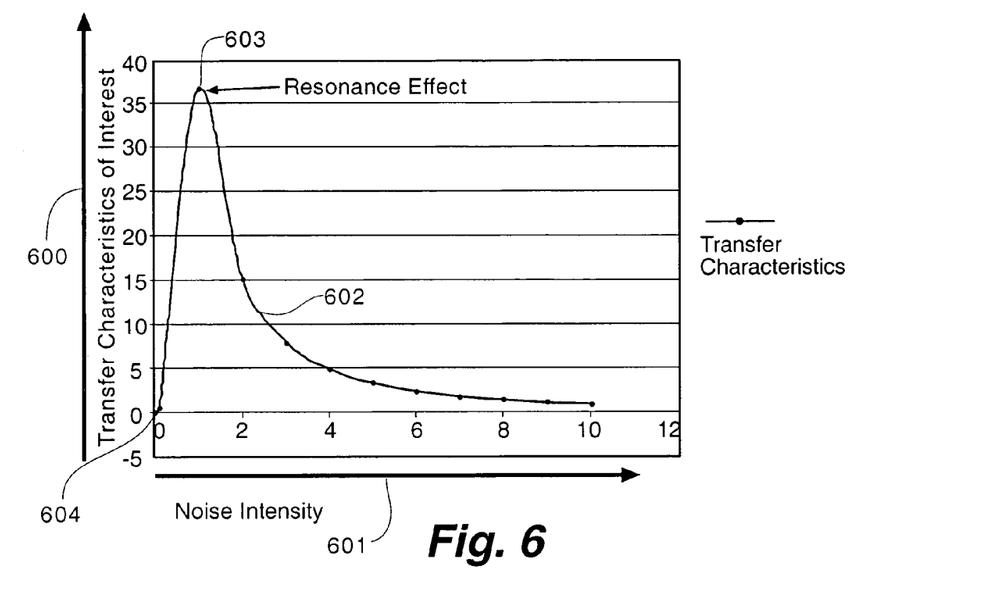
FIG. 6 shows a graph of a resonance curve of the signals of FIGS. 5a, 5b and 5c.

FIG. 6 shows a graph of a resonance curve of the signals of FIGS. 5a, 5b and 5c. In FIG. 6, the origin 604 corresponds to the case of no noise added or FIG. 5a. The x-axis 601 in FIG. 6 corresponds to the intensity of the noise added to S(t). The y-axis 600 is proportional to the probability of the correct detection of S(t) when it is really high. The curve in FIG. 6 starts at the origin 604 because with no noise added, the correct detection of S(t) when it is high is zero because it is initially always lower than h. In going to the right in FIG. 6, the noise intensity increases. The SR curves starts to rise from the origin because the number of missed negatives starts rapidly decreasing. The curve rises until the optimum amount of noise is added and the curve is at its resonance point 603. To the right of the resonance point, the curve starts to drop 602. This occurs because the number of missed negatives still is decreasing (as the noise intensity increases), but the number of false positives is increasing at a far greater rate, thus hurting the overall decision making process. One can now see why the terms "stochastic" and "resonance" are used to describe this process. In applications of signal processing (one-dimensional signals), the y-axis 600 of FIG. 6 can also be a signal-to-noise ratio improvement for the identification of one-dimensional signals.

The present invention will consider two or more dimensional signals involved in image processing. Amplification of a signal-to-noise ratio is well known with signals of a one-dimensional nature. It is commonly known that an increase in signal-to-noise ratio is generally correlated with improved detectability of targets, especially when immersed in high levels of uncertainty.

Again, it is emphasized that the state of the art at the present time is to just add noise to certain images. The present invention differs from the prior procedures in several novel aspects. First, no noise is added to the image. Only selected "confused pixels" are reassigned as either pure black (absence of color) or pure white (full color). Second, a parabolic template sets the standard for moving pixels either left or right. Third, the actual pixels adjusted must simultaneously satisfy two conditions: (i) they must have frequency that appears above the template, and (ii) they must have maximum darkness spatial gradient with respect to the other pixel candidates and fourth, N (the number of pixels to be moved) can be varied by the operator for maximum information throughput.

Outline of the Image Enhancement Process

For simplicity, a compressed image (.jpg) is considered. Consider an image of very poor quality in terms of object recognition. Also being a compressed image, there are inherent distortions already built into the picture making it a challenging task for discerning objects.

Step 1:

Decomposition of the image into the three primary colors and initially working with the most highly uncertain color. For each of the three primary colors (red, green, and blue), the original image is first decomposed into histograms of frequency of pixels versus darkness level, within each color. The color blue has the most uncertainty. This is analogous to the distributions in FIG. 4a having the most amount of overlap. With a great deal of overlap, by reassigning the pixels as either black or white (analogous to choosing $H_0$ or $H_1$ in FIG. 4a), the overlap areas $A_1$ and $A_2$ correspondingly decrease. For the highly uncertain pictures, here is where this effort can be most productive since this is the case for the greatest amount of overlap.

Step 2:

Construction of a parabolic template: A special parabolic template is constructed and the vertex of the parabola appears at the mean distribution of the total area under the histogram curve. The area under the parabola is slightly larger than the total area under the original histogram curve of the original image. A pure black and white rendering of a picture would produce only histograms on the black axis (darkness=0) or white axis (darkness=1). A parabola tries to distinguish edges (pure black and white) in the picture but at the same time allows for the distinction of classes of objects (other shades of black or white). Two biological reasons exist on this type of distinction: (a) light intensity varies inversely proportional to the square of the distance from a source, (b) the distribution of darkness levels of pixels has a physiological basis to be proportional to a parabola of the form shown in FIG. 10. Hence, there should be an exponential and parabolic dependence on frequency of pixels and gray levels. The parabola is just an approximation of the ability of humans to discern objects in an illumination sense.

Step 3:

Moving of the excess pixels above the template: An overlay plot is made of the true histograms (from the raw image) and the template. It is observed that the true data are, at times, above the template. The cases where the data (true histograms) are above the template, are candidates for moving to either 0 (pure black or absence of color) or to 1 (full color or maximum brightness). The assumption is that certain pixels cause the confusion factor (similar to the areas $A_1$ and $A_2$ in FIGS. 4a and 4b). By reassigning the pixels to the right or left (making a decision on the object—white or black), reduces the effective area in FIG. 4a as demonstrated by the fact that $A_3<A_1$ and $A_4<A_2$ in the comparison of FIG. 4a and FIG. 4b.

Step 4:

Choosing to move pixels with the maximum darkness spatial gradient. From step 3 we know that certain darkness levels provide candidates to be adjusted. It is extremely important to select the appropriate pixels in the picture (in a spatial sense)

that are to be adjusted. This is accomplished by generating a spatial gradient of all the candidate pixels. A spatial gradient is the rate of change of the darkness level with respect to spatial distance in the image in both the x and y direction. Of the candidate pixels in step 3, their spatial gradients are rank ordered in terms of their magnitude. The pixels with the maximum gradients are moved either left (to zero or pure black) or to the right (to 1.0 or pure white (maximum color)). It is clear that if an edge existed in the picture, the darkness spatial gradient would be at a maximum (sudden change from black to white). If a distinct object is in the picture, this gradient would be at a maximum and provides a good candidate to adjust the darkness level to 0 or 1 (indicating an edge may be at this spatial location).

Step 5:

Choosing to move only N pixels: Only N pixels are moved left. Also only N pixels are moved right. N is adjusted by the operator. N has analogy to the intensity of the noise level of the SR curve in FIG. 6. The optimum N is selected so that object identification is achieved. Too little N or too much N may be counterproductive to the improvement of object recognition by the operator. The adjustment knob in FIGS. 1 and 3 adjusts N, the number of pixels to move both left and right in the image enhancement process. As will be demonstrated below, the maximum information transfer occurs by moving the minimum number of N pixels that would enhance object identification. Much like the SR curve in FIG. 6, additional work (moving more than N pixels) may erode the possibility of identifying objects in the visual rendering. The human operator has the option of moving only N pixels until the information transferred has been optimized.

Step 6:

The operator may be displayed a movie file of this potential rendering to help him determine the proper N values that optimize the recognition of objects in the image.

Enhancing an Image to Improve Object Identifiability According to the Method of the Invention Consider a poor quality .jpg image taken from a TV. The quality of the image is poor for many reasons. First, being a .jpg image of size 338×415×3, it has been compressed. Secondly, the image color is only 8 bit (the darkness levels go from 1 to $256=2^8$ or from 0 to 1.0). The goal is to better identify the objects in the visual rendering. We review the five steps previously presented as applied to this specific image.

Figure 8:
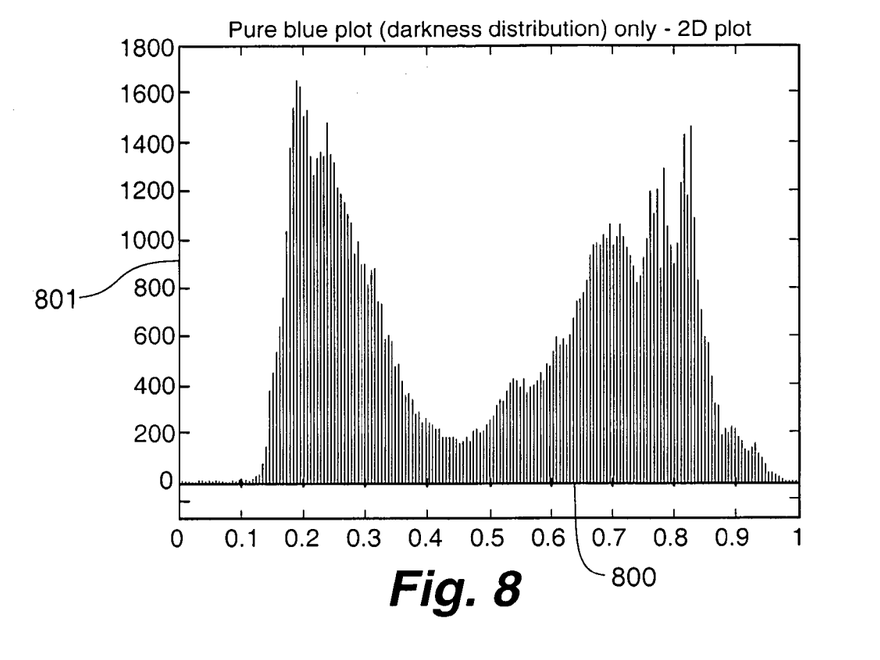
FIG. 8 shows a graph of a histogram of a picture according to the method of the invention.

Step 1:

Such poor quality .jpg image is first viewed separately in each of the primary color slices. FIG. 8 shows a histogram for the primary color blue. In FIG. 8, the histogram plots frequency of the pixels on the x-axis at 800 versus darkness level for the blue color at 801. Since blue is the color with the least information (most noisy picture), the remaining analysis will concentrate on the blue color.

Figure 9:
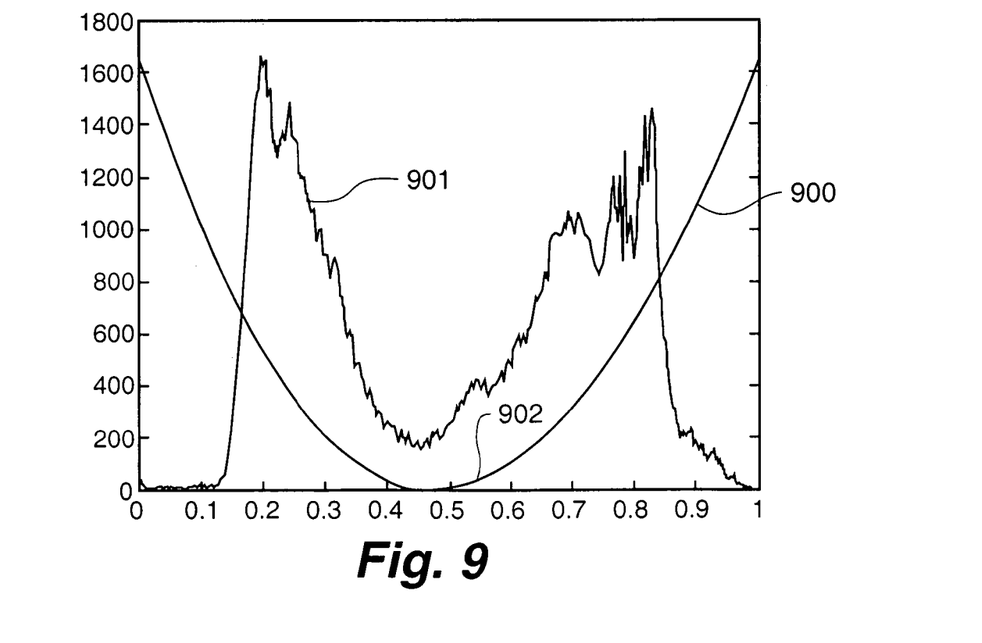
FIG. 9 shows a graph of an overlay of a parabolic template and actual histogram data.

Step 2:

Working with the blue color slice, a parabola template is constructed. FIG. 9 shows the overlay of the parabola template, illustrated at 900 and the actual histogram at 901. The vertex of the parabola template touches the x-axis at the mean value of the histograms at 902.

Step 3:

The area under the parabola is made slightly larger than the area under the histogram curve. The proportion of area between the left and right sides of the parabola template is adjusted as to the same ratio as a pure black and white rendering of the original picture. This is accomplished (e.g., in the computer software MATLAB™) by the following process: a threshold is set on the darkness level, usually at 0.5, if the darkness levels vary from 0 to 1. For each pixel, if the darkness level is <=0.5, it is set to zero. If the darkness level is >0.5, it is set to 1.0. The ratio of the total number of pixels that now appear at 0 to the total number of overall pixels would be the relative area under the parabola on the left side of FIG. 9.

Figure 10:
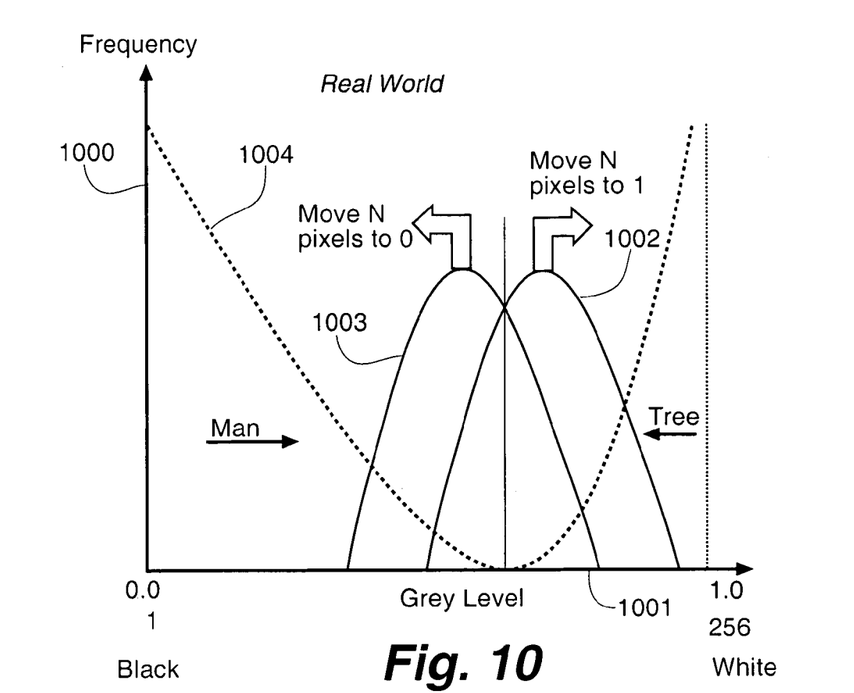
FIG. 10 is a graph illustrating the step of moving pixels to different darkness levels.

Step 4:

From FIG. 9, it can be seen that certain pixels must have their darkness level adjusted accordingly. In FIG. 10, the next step is illustrated which is to move candidate pixels to different darkness levels, either left or right, to make decisions on special pixels in the image and aid in the distinguishing of objects within the picture. In FIG. 10, the x-axis 1001 represents intensity from black to white and the y-axis at 1000 represents frequency.

A darkness level spatial gradient (darkness level to spatial position) is computed and illustrated within the original image. The darkness level spatial gradient is a 338×415 matrix for each color and represents how, spatially, the darkness levels vary across the picture in both the x and y direction.

Step 5:

N pixels are selected to have their darkness level adjusted. Starting at the vertex of the parabola in FIG. 10, we move N pixels to the left 1003 (made black or having no color) for those pixels that are above the parabola template and have the maximum darkness spatial gradient. Similarly, N pixels are selected to have their darkness level adjusted to full color and moved to the right 1002. We now examine how the value of N affects the ability of an operator to discern objects in the environment.

To study the effect of the algorithm presented herein on improved decision making, a Monte Carlo computer simulation is performed. A Monte Carlo simulation adds randomness to a system and the performance of the overall system may be evaluated by looking at expected (mean values) of certain output variables. These simulations are valuable because performance measures may be obtained when the mathematics or physics of a problem is too difficult to understand or determine in closed form.

Figure 12:
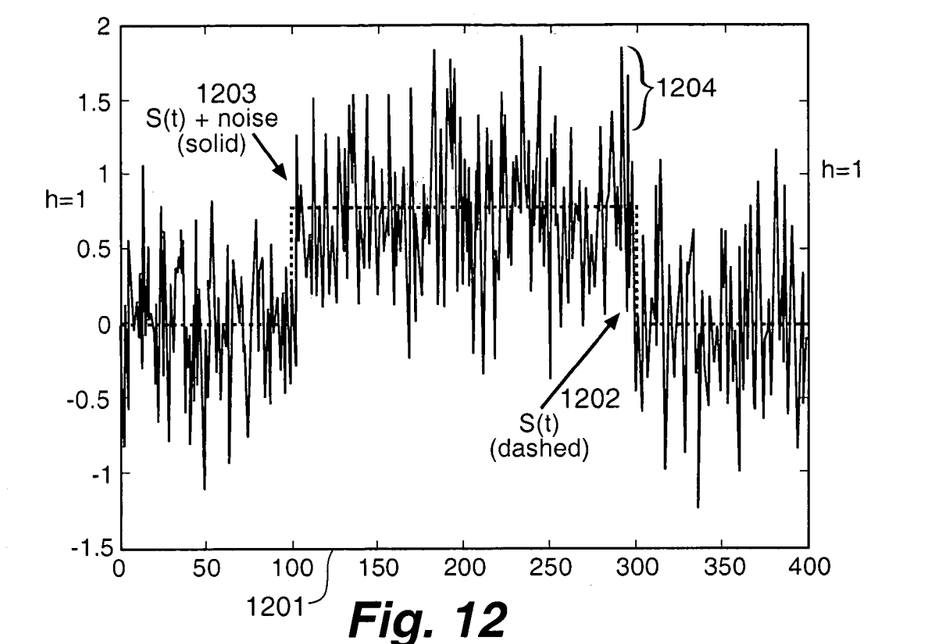
FIG. 12 shows a graph of the signal and noise of FIG. 11.

The Monte Carlo simulation assumes a wide range of noise values. In all cases the highest value of S(t) with no noise added is always less than h (|S(t)|<h). Random white noise is then added to S(t). For simplicity a 50% duty cycle will be assumed for S(t). This means that S(t) is a pulse which is high 50% of the time and low 50% of the time. The goal is to find the level of noise that helps promote the correct detection of S(t) being high, when this is the correct event. FIG. 12 is a graph illustrating these assumptions. FIG. 12 shows the signal S(t) which is high 50% of the time, and low 50% of the time. FIG. 12 portrays the signal S(t) using a dashed line at 1202 and (S(t)+noise) at 1302 for h=1. It is clear that there are cases when S(t)+noise exceeds the threshold h, illustrated at 1204, when S(t) is really low (false positives occur). Also when S(t)+noise may be still be less than h when S(t) is in the high state (missed negatives occur). These simulations will have max |S(t)|/h=0.8. For simplicity, the threshold h was set to h=1.0.

Figure 13:
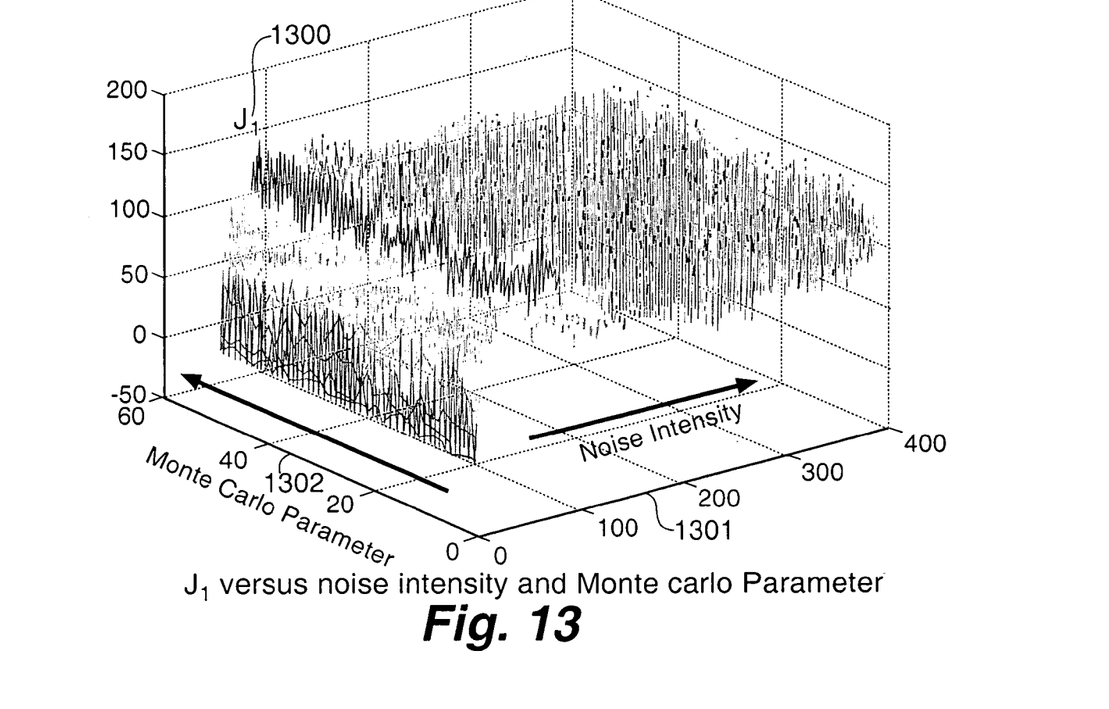
FIG. 13 shows a three-dimensional plot of the performance metric versus the noise parameter gain and the Monte Carlo simulation parameter.

FIG. 13 shows a three-dimensional plot of $J_1$ on the z-axis at 1300 versus the noise parameter gain1 on the x-axis at 1301 (from 1-400) and the Monte Carlo simulation parameter on the y-axis at 1302 (1-50 random runs).

Figure 11:
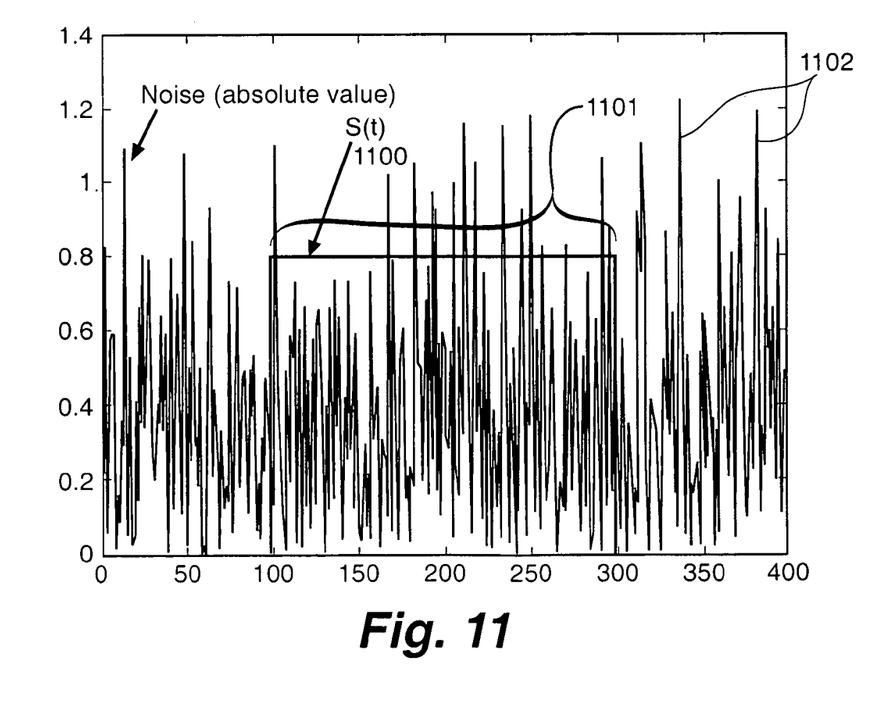
FIG. 11 shows a graph of a stochastic noise pulse high 50% of the time and low 50% of the time.

The performance of the system can be related to correct decision making. From FIG. 11, it is apparent that with no noise added, assuming 400 time samples, that 200 missed negatives occur automatically and 0 false positives are determined. Zero hits are scored in this scenario. A hit is defined as when S(t)+noise is greater or equal to h, when S(t) is really high. The performance metric chosen is $J_1$ (based on a 400 sample time series) where:

$$J_1 = 200 - \text{number of missed negatives} - \text{number of false positives} + \text{hits} \qquad (\text{Eq. 1})$$

Thus $J_1=0$ if no noise is added to S(t). If $J_1$ increases above zero, this is an improvement on decision making. The goal is to plot the performance metric $J_1$ versus the intensity of the noise.

Figure 14:
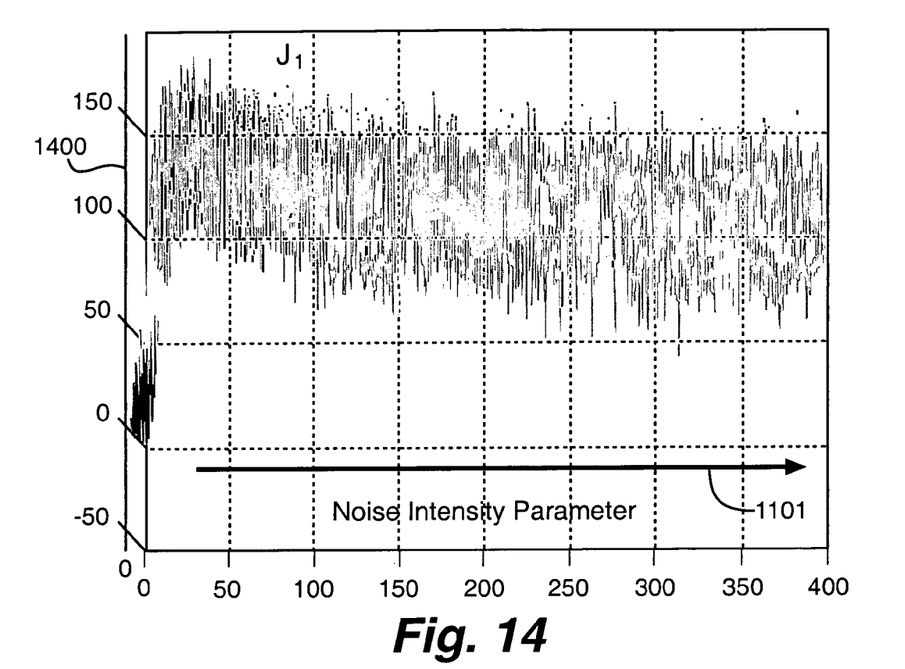
FIG. 14 shows a rotation of the FIG. 13 plot.
Figure 15:
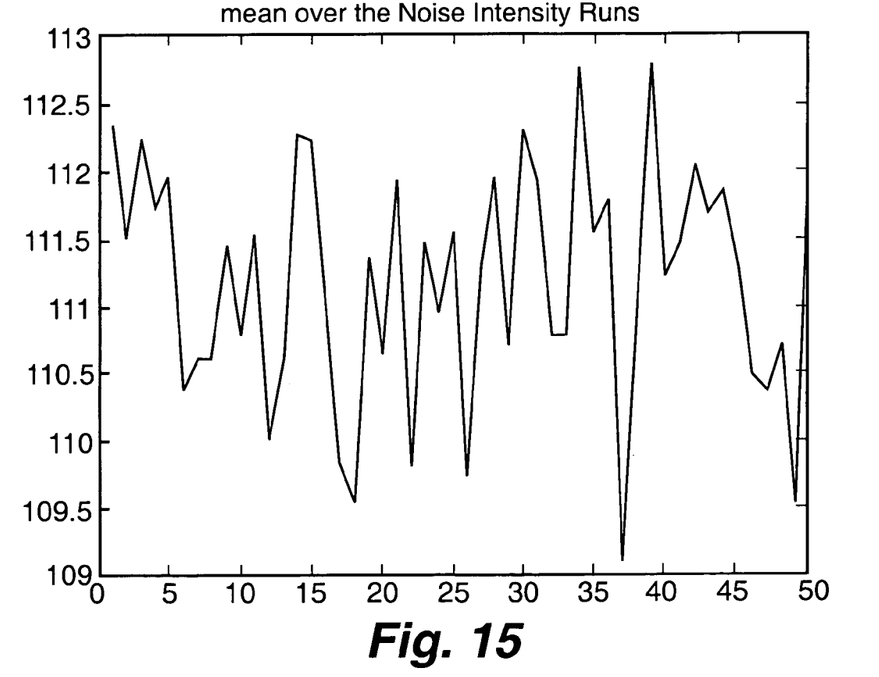
FIG. 15 shows a graph of the performance averaged across all 400 noise runs.
Figure 16:
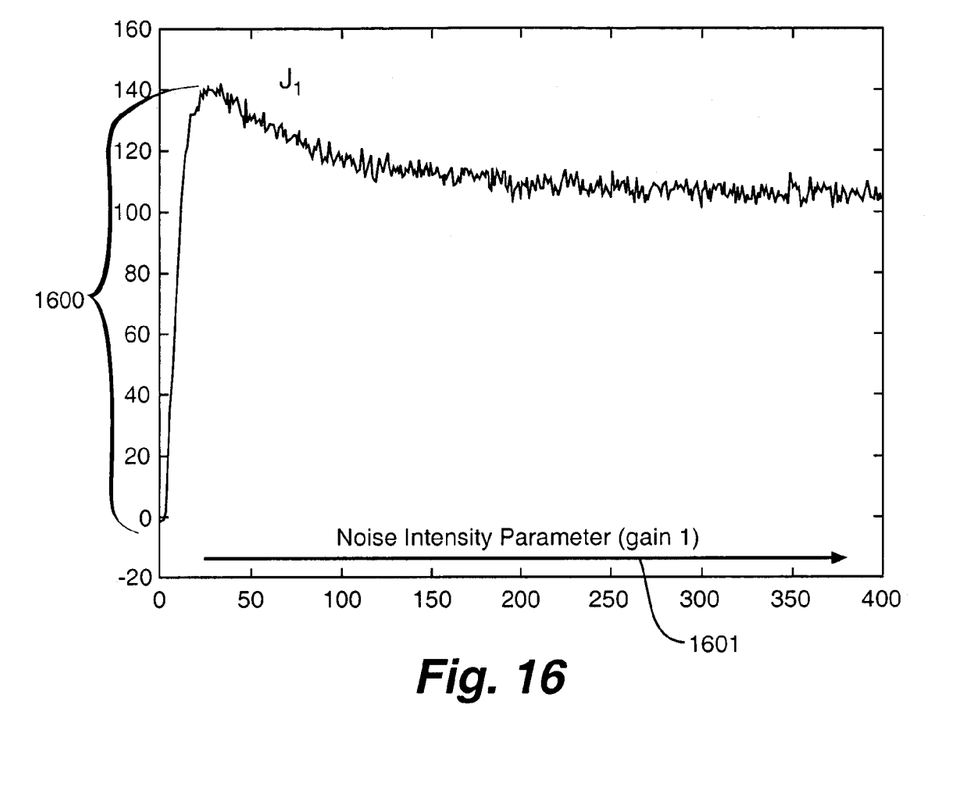
FIG. 16 shows a resonance effect of the graph of FIG. 15.

To quantify the level of uncertainty, gain1 is defined as a noise intensity parameter which multiplies the random noise generator producing the signal to be added to S(t). Thus the power in the noise is proportional to $(\text{gain1})^2$. The key to success in this study is to see how $J_1$ varies with respect to gain1 for different Monte Carlo runs. FIG. 14 shows a graph of the performance of FIGS. 12 and 13 averaged across all 400 noise runs. FIG. 14 rotates FIG. 13 to observe the general trends in the performance metric $J_1$ 1400 versus the noise parameter on the noise intensity axis 1401. FIG. 15 shows $J_1$ averaged across all 400 noise runs to show the variability due only to the Monte Carlo generation of the noise. For the 50 Monte Carlo runs displayed, the ratio of standard deviation to mean is less than 10 percent. FIG. 16 is the final plot we wish to compare to FIG. 2. Here the independent variable is the noise intensity parameter (gain1) 1601 and the averaging is across the 50 Monte Carlo runs. FIG. 16 shows the true resonance effect and has similarities to the hypothesized curve in FIG. 2. The amount of improvement is striking. $J_1$ increases from zero to almost 140 units, illustrated at 1600, showing substantial improvement over the no noise case.

The foregoing description of the preferred embodiment has been presented for purposes of illustration and description. It is not intended to be exhaustive or to limit the invention to the precise form disclosed. Obvious modification or variations are possible in light of the above teachings. The embodiment was chosen and described to provide the best illustration of the principles of the invention and its practical application to thereby enable one of ordinary skill in the art to utilize the invention in various embodiments and with various modifications as are suited to the particular scope of the invention as determined by the appended claims when interpreted in accordance with the breadth to which they are fairly, legally and equitably entitled.

What is claimed is:

1. An image enhancement method comprising the steps of:
   receiving visual data of a desired object within a compressed image;
   transmitting said visual data to a central processing unit;
   decomposing said visual data into histograms of frequency of pixels versus darkness level within each primary color red, blue and green;
   selecting the most highly uncertain color from said decomposing step;
   constructing a parabolic template with the vertex of the parabola appearing at the mean distribution of the total area under the histogram curve;
   overlaying a true histogram from said visual data and said parabolic template;
   generating a spatial gradient of all candidate pixels;
   moving N number of pixels with maximum gradients through operator adjustment based on visual enhancement; and
   transferring an output signal of an enhanced visual image of said desired object from said central processing unit to said operator.

2. The image enhancement method of claim 1 wherein said step of receiving visual data of a desired object within a compressed image using multi-spectral sensors further comprises receiving visual data of a desired object within a compressed image using multi-spectral sensors from an operator wearing a head mounted display.

3. The image enhancement method of claim 1 wherein said step of receiving visual data of a desired object using multi-spectral sensors further comprises providing a digital image to an operator wearing an eye-glass system.

4. The image enhancement method of claim 1 wherein said step of moving pixels with maximum gradient further comprises moving pixels with maximum gradient left to zero or pure black.

5. The image enhancement method of claim 1 wherein said step of moving pixels with maximum gradient further comprises moving pixels with maximum gradient right to one or pure white.

6. The image enhancement method of claim 1 wherein said step of receiving visual data of a desired object within a compressed image further comprises receiving visual data of a desired object within a compressed .jpg image.

7. The image enhancement method of claim 1 wherein said step of overlaying a true histogram from said visual data and said parabolic template further comprises determining a mean value of said histogram where a vertex of said parabolic template touches an x-axis.

8. The image enhancement method of claim 1 wherein said step of overlaying a true histogram from said visual data and said parabolic template further comprises the steps of:
   selecting a threshold for darkness level;
   first setting a darkness level to zero when, for each pixel, the darkness level is less than or equal to said threshold; and
   second setting a darkness level to one, when for each pixel, the darkness level is greater than the threshold.

9. The image enhancement method of claim 8 wherein said step of setting a threshold further comprises setting a threshold of 0.5 for a darkness level varying between 0 and 1.

10. The image enhancement method of claim 1 further including, after said selecting step, the step of reassigning pixels as black and white.

11. The image enhancement method of claim 1 wherein said step of generating a spatial gradient of all candidate pixels further comprises generating a spatial gradient of all candidate pixels and rank ordering said spatial gradients in terms of magnitude.

12. The image enhancement method of claim 1 wherein said step of moving N number of pixels with maximum gradients through operator adjustment further comprises moving N number of pixels with maximum gradients through operator adjustment knob manipulation.

13. The image enhancement method of claim 1 wherein said step of receiving visual data of a desired object within a compressed image further comprises receiving visual data of a desired object within a compressed image using multi-spectral sensors.

14. The image enhancement method of claim 1 wherein said step of receiving visual data of a desired object within an compressed image further comprises receiving visual data of a desired object within an 8-bit color compressed image.

15. An image enhancement method comprising the steps of:
   receiving visual data of a desired object within a compressed image using multi-spectral sensors from an operator wearing a head-mounted display;
   transmitting said visual data to a central processing unit;
   decomposing said visual data into histograms of frequency pixels versus darkness level within each primary color red, blue and green and selecting the most highly uncertain color;
   constructing a parabolic template with the vertex of the parabola appearing at the mean distribution of the total area under the histogram curve;
   overlaying a true histogram from said visual data and said parabolic template comprising the step of:
   selecting a threshold of 0.5 for a darkness level varying between 0 and 1;
   first setting a darkness level to zero when, for each pixel, the darkness level is less than or equal to said threshold; and
   second setting a darkness level to one, when for each pixel, the darkness level is greater than the threshold;
   generating a spatial gradient of all candidate pixels;
   moving N number of pixels with maximum gradients through operator adjustment knob manipulation; and
   transferring an output signal of an enhanced visual image of said desired object from said central processing unit to said operator.

* * * * *